United States Patent
Kawajiri

(10) Patent No.: US 12,217,189 B2
(45) Date of Patent: Feb. 4, 2025

(54) HYPERPARAMETER ADJUSTMENT DEVICE, NON-TRANSITORY RECORDING MEDIUM IN WHICH HYPERPARAMETER ADJUSTMENT PROGRAM IS RECORDED, AND HYPERPARAMETER ADJUSTMENT PROGRAM

(71) Applicant: Aizoth Inc., Ibaraki (JP)

(72) Inventor: Kotaro Kawajiri, Ibaraki (JP)

(73) Assignee: Aizoth Inc., Ibaraki (JP)

( * ) Notice: Subject to any disclaimer, the term of this patent is extended or adjusted under 35 U.S.C. 154(b) by 49 days.

(21) Appl. No.: 18/008,500

(22) PCT Filed: Sep. 10, 2020

(86) PCT No.: PCT/JP2020/034354
§ 371 (c)(1),
(2) Date: Dec. 6, 2022

(87) PCT Pub. No.: WO2022/054209
PCT Pub. Date: Mar. 17, 2022

(65) Prior Publication Data
US 2023/0214668 A1 Jul. 6, 2023

(51) Int. Cl.
*G06N 3/0985* (2023.01)
*G06N 3/126* (2023.01)
(52) U.S. Cl.
CPC ........... *G06N 3/0985* (2023.01); *G06N 3/126* (2013.01)
(58) Field of Classification Search
CPC ......... G06N 3/0985; G06N 3/126; G06N 3/08
See application file for complete search history.

(56) References Cited

U.S. PATENT DOCUMENTS

2018/0240041 A1  8/2018  Koch et al.
2018/0365557 A1  12/2018  Kobayashi
(Continued)

FOREIGN PATENT DOCUMENTS

CN  109242001 A  1/2019
CN  109242105 A  1/2019
(Continued)

OTHER PUBLICATIONS

Mantovani et al. "A meta-learning recommender system for hyperparameter tuning: Predicting when tuning improves SVM classifiers", 2019, pp. 49, https://arxiv.org/pdf/1906.01684.*
(Continued)

*Primary Examiner* — Li Wu Chang
(74) *Attorney, Agent, or Firm* — Ice Miller LLP; Justin D. Swindells

(57) ABSTRACT

A learning processing unit that causes a second neural network (NN) to be trained, with a hyperparameter set of a first NN accepted as input, so as to output post-learning performance that is the performance of a trained first NN to which the hyperparameter set is set. A GA processing unit adjusts the hyperparameter set of the first NN by a genetic algorithm, with the hyperparameter set of the first NN handled as entity, the fitness of said algorithm being configured to be a value that corresponds to the post-learning performance of the first NN to which the hyperparameter set is set. In processing in each generation of the genetic algorithm, the post-learning performance of the first NN corresponding to each hyperparameter is acquired using the second NN.

6 Claims, 7 Drawing Sheets

(56) References Cited

U.S. PATENT DOCUMENTS

| | | | |
|---|---|---|---|
| 2019/0034803 A1 | 1/2019 | Gotou | |
| 2019/0095819 A1 | 3/2019 | Varadarajan et al. | |
| 2020/0143243 A1* | 5/2020 | Liang | G06N 3/045 |
| 2021/0019615 A1* | 1/2021 | Sakakini | G06N 3/044 |
| 2021/0232906 A1* | 7/2021 | Shaabana | G06N 3/006 |

FOREIGN PATENT DOCUMENTS

| | | |
|---|---|---|
| CN | 110443364 A | 11/2019 |
| CN | 110633797 A | 12/2019 |
| JP | 6351671 B | 6/2018 |
| JP | 6523379 B | 5/2019 |
| JP | 2020123292 A | 8/2020 |
| WO | WO 2017/154284 A1 | 9/2017 |

OTHER PUBLICATIONS

Schmidt et al. "On the performance of differential evolution for hyperparameter tuning", 2019, pp. 8, https://arxiv.org/pdf/1904.06960.*

International Search Report for Application No. PCT/JP2020/034354, mailed Dec. 8, 2020, with English translation (5 pages).

Kyoko Ogawa et al.; "Problem Solving by Means of evolutionary Machine Learning"; pp. 107-113; May 27, 2019; English abstract only. English translation not available (7 pages).

Kohji Omata et al.; "Optimization of Cu—Zn—Al Oxide Catalyst for Methanol Synthesis Using Genetic Algorithm and Neural Network at Its Evaluation Function"; Journal of the Japan Petroleum Institute, vol. 45, No. 3, pp. 192-195; 2002, with English abstract only (4 pages).

Mamoru Mitsuishi et al.; "Development of a High-Precision Machining Center Using Neural Networks and Genetic Algorithm"; Transactions of the Japan Society of Mechanical Engineers (Series C), vol. 61, No. 591, pp. 395-400; Nov. 1995, with English abstract only (6 pages).

Masanori Takuma et al.; "Study on Support System for Design of Composite Laminated Plate ($1^{st}$ Report, Application of Genetic Algorithm and Neural Network)"; Transactions of the Japan Society of Mechanical Engineers, vol. 64, No. 624, pp. 62-68; with English abstract only; Aug. 25, 1998 (7 pages).

Manami Miyazaki et al.; "Development of Tetris controller using neural network and genetic algorithm"; Information Processing Center of Japan, pp. 539-540; copyright 2012; with English translation (7 pages).

Extended European Search Report for EP 20953274.6, Jan. 10, 2024, 10 pages.

Chinese Notice of Grounds of Rejection (First Office Action) dated Oct. 25, 2024 from the China National Intellectual Property Administration (CNIPA); issued in counterpart Chinese Application No. 202080101959.8.

* cited by examiner

| HYPERPARAMETER SET OF FIRST NN ||||||  | POST-LEARNING PERFORMANCE (POST-LEARNING ERROR) |
|---|---|---|---|---|---|---|
| NUMBER OF EPOCHS | NUMBER OF HIDDEN LAYERS | NUMBER OF NEURONS IN EACH HIDDEN LAYER | NUMBER OF DROPOUTS | NUMBER OF BATCHES | ... | |
| 1740 | 9 | 8 | 0.7 | 20 | ... | 0.25 |
| 3880 | 8 | 7 | 0.4 | 70 | ... | 0.45 |
| 7180 | 6 | 2 | 0.7 | 90 | ... | 0.10 |
| 840 | 9 | 10 | 0.8 | 70 | ... | 0.20 |
| ... | ... | ... | ... | ... | ... | ... |

FIG. 4

HYPERPARAMETER ADJUSTMENT DEVICE, NON-TRANSITORY RECORDING MEDIUM IN WHICH HYPERPARAMETER ADJUSTMENT PROGRAM IS RECORDED, AND HYPERPARAMETER ADJUSTMENT PROGRAM

CROSS-REFERENCE TO RELATED APPLICATIONS

This application is a U.S. National Stage of International Application No. PCT/JP2020/034354, filed Sep. 10, 2020, the contents of which are incorporated herein by reference in their entirety.

TECHNICAL FIELD

The present invention relates to a hyperparameter tuning device, a non-transitory recording medium in which a hyperparameter tuning program is recorded, and a hyperparameter tuning program.

BACKGROUND

Conventionally, a neural network (hereinafter, in the present description, there is a case where it is described as a "neural network (NN)") is known. The NN is a model that is configured by simulating a brain function, and has a configuration in which connection is made between a plurality of layers each including one or a plurality of nodes referred to as neurons. The NN estimates output data corresponding to input data on the basis of input data, and outputs the output data.

Training the NN using learning data allows the NN to output highly accurate output data corresponding to unknown input data. As learning processing of the NN progresses, parameters included in the NN are tuned (changed). Examples of parameters of the NN changed through the learning processing include weights defined for edges connecting neurons, and biases defined for respective neurons.

Among parameters included in the NN, there are parameters that are other than the weight and the bias described above, and that are not changed by the learning processing. Such parameters are referred to as hyperparameters. Examples of the hyperparameters include, but are not limited to, the number of epochs (the number of repeated uses of one piece of learning data), the number of hidden layers (the number of layers other than input layers closest to the input side and output layers closest to the output side), the number of neurons in each hidden layer (the number of neurons included in each hidden layer), the number of dropouts (the number of neurons whose weights and biases are not tuned in the learning processing (inactive neurons)), or the number of batches (the number of pieces of learning data included in each subset when the learning data is divided into a plurality of subsets). It can also be said that a hyperparameter is a parameter representing the structure of the NN, or a learning method.

Here, it is known that variation occurs in the output accuracy of the NN that has been sufficiently trained, and in the learning efficiency of the NN (the output accuracy of the NN when training is performed a predetermined number of times), in accordance with the hyperparameter of the NN. Thus, an administrator or a user of the NN preferably sets the hyperparameter of the NN to an appropriate value. It should be noted that an appropriate hyperparameter typically varies depending on an analysis target of the NN; that is, input data input to the NN.

In view of this, conventional techniques have been proposed, each of which is used for determining an appropriate hyperparameter set (a set of a plurality of values for items of a plurality of hyperparameters) of an NN, by using tuning processing. A genetic algorithm (also simply referred to as a "genetic algorithm (GA)") is known as an example of such tuning processing. For example, Patent Document 1 discloses determination of an optimal hyperparameter set of an NN by using a genetic algorithm. In this genetic algorithm, a hyperparameter set of the NN is used as an individual, and a value corresponding to the output error of the NN in which this hyperparameter set is set and that has been trained is used as fitness. Patent Document 2 discloses determination of an optimal structure of an NN by using a genetic algorithm. In this genetic algorithm, the structure of the NN is used as an individual, and a value corresponding to the output error of the NN that has this structure and that has been trained is used as fitness.

It should be noted that Non Patent Document 1 discloses a technique in which learning data used in an NN is designated by using a genetic algorithm. Although a hyperparameter set of the NN is not determined in this technique, it is used as a technique in which an NN and a genetic algorithm are combined. Non Patent Document 2 discloses use of a genetic algorithm in which a set of a weight and a bias of an NN is used as an individual, in order to avoid falling into a local solution when the NN is trained.

CITATION LIST

Patent Literature

Patent Document 1: JP 6523379 B
Patent Document 2: JP 6351671 B

Non Patent Literature

Non Patent Document 1: Kohji OMATA et al., "Optimization of Cu—Zn—Al Oxide Catalyst for Methanol Synthesis Using Genetic Algorithm and Neural Network as Its Evaluation Function," Journal of the Japan Petroleum Institute, Vol. 45, No. 3, (2002), pp. 192-195

Non Patent Document 2: Mamoru MITSUISHI et al., "Development of a High-Precision Machining Center Using Neural Networks and Genetic Algorithm," Transactions of the Japan Society of Mechanical Engineers (Series C), Vol. 61, No. 591, (November 1995), pp. 395-400

SUMMARY

Technical Problem

In a case where a hyperparameter set of an NN is to be tuned by tuning processing, there may be a problem that an enormous processing volume or enormous processing time is required for the tuning processing. In particular, in conventional tuning processing including a genetic algorithm, there is a case where it is necessary to sufficiently train a plurality of NNs in which respective different hyperparameter sets are set. In such a case, there may be a problem that an enormous processing volume or enormous processing time is required for training the NNs, in the tuning processing. This problem will be described with reference to FIG.

8. FIG. 8 is a conceptual diagram illustrating tuning processing for hyperparameter sets of an NN using a conventional genetic algorithm.

An individual used in the genetic algorithm is a hyperparameter set of the NN. Each gene forming the individual is a hyperparameter forming the hyperparameter set. Then, the fitness (also referred to as goodness of fit) of each individual is a value corresponding to the performance of the NN in which each hyperparameter set, serving as each individual, is set and that has been trained. The performance of the NN is, for example, an output error (a difference between output data of the NN responsive to certain input data, and true data (that is, correct data) corresponding to the input data) of the NN, analysis time that is time from when input data is input to the NN to when output data is output, a combination thereof, or the like. In the present description, in particular, the performance of an NN that has been sufficiently trained is referred to as the "post-learning performance." In the post-learning performance, the output error of the sufficiently trained NN is referred to as the "post-learning error," and the analysis time for the sufficiently trained NN is referred to as the "post-learning analysis time." In a case where an individual; that is, a hyperparameter set, is indicative of being more excellent as the fitness is higher, for example, the fitness of each individual can be regarded as higher as post-learning performance is higher (that is, a post-learning error is smaller, or post-learning analysis time is shorter). The fitness for each individual may be determined on the basis of a plurality of post-learning performances of a plurality of trained NNs in which the same hyperparameter is set. For example, the fitness for each individual may be an average value of a plurality of post-learning errors for the same hyperparameter, or an average value of a plurality of pieces of post-learning analysis time for the same hyperparameter.

As illustrated in FIG. 8, first, N individuals; that is, N first-generation hyperparameter sets are prepared as an initial population. The value of each hyperparameter included in the N first-generation hyperparameter sets may be randomly selected. In FIG. 8, an n-th hyperparameter set of an m-th generation is described as a "hyperparameter set m-n." For example, the second hyperparameter set of the first generation is described as a "hyperparameter set 1-2."

Next, the fitness of each of the N first-generation hyperparameter sets is calculated. As described above, the fitness of each hyperparameter set is calculated on the basis of the post-learning performance of the NN in which the hyperparameter set is set. In the example of FIG. 8, each post-learning error is illustrated as the post-learning performance. Accordingly, it is necessary to sufficiently train each of the N NNs in which the respective hyperparameter sets are set, in order to calculate the fitness for each of the respective hyperparameter sets. In particular, in a case where the fitness of each hyperparameter set is determined on the basis of the respective post-learning performances of a plurality of (here, P) trained NNs in which the same hyperparameter is set, it is necessary to train each of the N NNs P times.

Next, N second-generation hyperparameter sets are generated, on the basis of the calculated fitness of each of the N first-generation hyperparameter sets. Examples of a method of acquiring the N second-generation hyperparameter sets include various methods. An example is elite preservation in which a hyperparameter set with high fitness is preserved among the N first-generation hyperparameter sets. Another example is crossover in which exchange of one or more hyperparameters is made between two hyperparameter sets selected from first-generation hyperparameter sets. Still another example is mutation in which a hyperparameter included in a first-generation hyperparameter set is randomly changed. Detailed description for the method is omitted herein because the method can be adopted as that used in a conventional genetic algorithm.

The fitness of each of the N second-generation hyperparameter sets is further calculated. Also in the second generation, similarly to the first generation, it is necessary to sufficiently train each of the N NNs in which the respective hyperparameter sets are set, in order to calculate the fitness for the respective hyperparameter sets. Here, in a case where the fitness of each hyperparameter set is determined on the basis of the respective post-learning performances of P trained NNs in which the same hyperparameter is set, it is necessary to train each of the N NNs P times.

Then, N third-generation hyperparameter sets are generated, on the basis of the calculated fitness of each of the N second-generation hyperparameter sets. Thereafter, processing similar to the above processing is repeated while advancing the generation. By repeating the processing described above while advancing the generation, the hyperparameters of the NN are tuned. As a result, it is possible to acquire an individual with high fitness; that is, a hyperparameter set with high post-learning performance (ideally, an optimal hyperparameter set) of the NN.

The genetic algorithm is executed until a predetermined end condition is satisfied. Examples of the predetermined end condition include completion of processing up to a predetermined generation, completion of generating an individual with fitness exceeding a predetermined level, or attainment of a state in which average fitness of N individuals of a predetermined generation has reached a predetermined threshold value or higher.

The processing is executed as described above, and thus, in a case where hyperparameter sets of an NN are tuned by using a genetic algorithm in which processing for G generations is executed and N hyperparameter sets are used as individuals in one generation, it is necessary to sufficiently train G×N NNs. Further, in a case where the fitness of each hyperparameter set is determined on the basis of the respective post-learning performances of P trained NNs in which the same hyperparameter is set, it is necessary to train each of the G×N NNs P times. That is, it is necessary to execute learning processing in the same manner as processing for sufficiently training G×N×P NNs in terms of processing amount. Considering enormous processing amount or processing time is required for training, in order to sufficiently train G×N NNs or G×N×P NNs.

Besides a case where a genetic algorithm is used, even in a case where, on the basis of respective post-learning errors of a plurality of NNs in which respective different hyperparameter sets are set, the respective hyperparameter sets of the plurality of NNs are tuned, it is necessary to sufficiently train each NN, in order to acquire the post-learning errors of the plurality of NNs.

An object of a hyperparameter tuning device disclosed in the present description is to reduce a processing amount or processing time required when a hyperparameter set of a neural network is tuned by tuning processing.

Solution to Problem

A hyperparameter tuning device disclosed in the present description includes: a learning processing unit that is configured to train a learner, using a hyperparameter set of a first neural network as input of the learner, to cause the learner to output post-learning performance, the post-learning performance being performance of the first neural network in which the hyperparameter set is set and that has been trained; and a hyperparameter tuning unit that is configured to tune the hyperparameter set of the first neural network, based on the post-learning performance of a plurality of the first neural networks in each of which a corresponding one of a plurality of hyperparameter sets of the first neural network is set, the post-learning performance of the plurality of the first neural networks being acquired by inputting each of the plurality of hyperparameter sets to the learner that has been trained.

The hyperparameter tuning unit may be configured to tune the hyperparameter set of the first neural network by using a heuristic search technique, the heuristic search technique using the post-learning performance of a plurality of the first neural networks in each of which a corresponding one of a plurality of hyperparameter sets of the first neural network is set, the post-learning performance of the plurality of the first neural networks being acquired by inputting each of the plurality of hyperparameter sets to the learner that has been trained.

The hyperparameter tuning unit may be a genetic algorithm processing unit that is configured to tune the hyperparameter set of the first neural network by using a genetic algorithm, the genetic algorithm using, as an individual, the hyperparameter set of the first neural network and using, as fitness, a value corresponding to the post-learning performance of the first neural network in which the hyperparameter set is set and that has been trained, the post-learning performance of the first neural network being acquired by inputting the hyperparameter set to the learner that has been trained.

A learner parameter determination unit may be further included that is configured to determine a hyperparameter of the learner, in accordance with analysis target data input to the first neural network.

The learner may include a second neural network that is different from the first neural network.

In addition, a recording medium disclosed in the present description is a non-transitory computer-readable recording medium in which a hyperparameter tuning program is recorded, the hyperparameter tuning program causing a computer to function as: a learning processing unit that is configured to train a learner, using a hyperparameter set of a first neural network as input of the learner, to cause the learner to output post-learning performance, the post-learning performance being performance of the first neural network in which the hyperparameter set is set and that has been trained; and a hyperparameter tuning unit that is configured to tune the hyperparameter set of the first neural network, based on the post-learning performance of a plurality of the first neural networks in each of which a corresponding one of a plurality of hyperparameter sets of the first neural network is set, the post-learning performance of the plurality of the first neural networks being acquired by inputting each of the plurality of hyperparameter sets to the learner that has been trained.

Further, a hyperparameter tuning program disclosed in the present description causes a computer to function as: a learning processing unit that is configured to train a learner, using a hyperparameter set of a first neural network as input of the learner, to cause the learner to output post-learning performance, the post-learning performance being performance of the first neural network in which the hyperparameter set is set and that has been trained; and a hyperparameter tuning unit that is configured to tune the hyperparameter set of the first neural network, based on the post-learning performance of a plurality of the first neural networks in each of which a corresponding one of a plurality of hyperparameter sets of the first neural network is set, the post-learning performance of the plurality of the first neural networks being acquired by inputting each of the plurality of hyperparameter sets to the learner that has been trained.

Advantageous Effects of Invention

According to a hyperparameter tuning device disclosed in the present description, it is possible to reduce a processing amount or processing time required when a hyperparameter set of a neural network is tuned by tuning processing.

BRIEF DESCRIPTION OF DRAWINGS

FIG. 4 is a diagram illustrating an example of learning data used for a second NN.

DESCRIPTION OF EMBODIMENT

Figure 1:
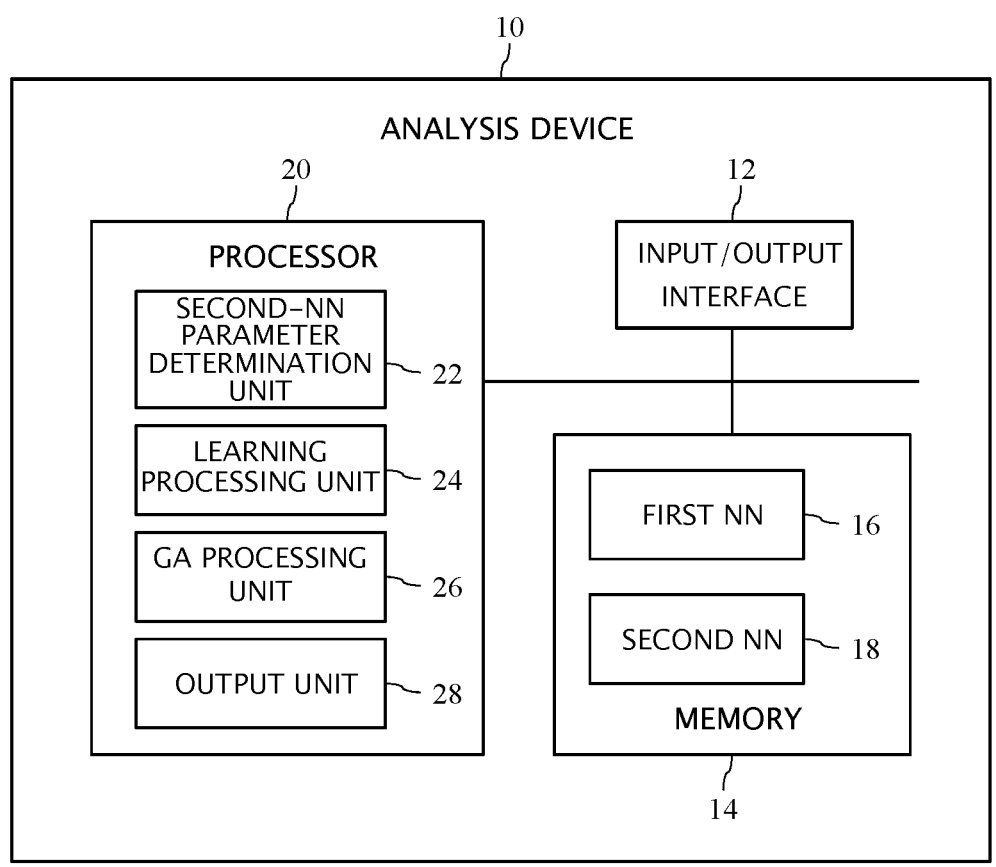
FIG. 1 is a schematic configuration diagram of an analysis device according to the present embodiment.

FIG. 1 is a schematic configuration diagram of an analysis device 10, which serves as a hyperparameter tuning device, according to the present embodiment. The analysis device 10 according to the present embodiment includes a server computer. However, any device may be used for the analysis device 10 so long as the functions described below can be exhibited. For example, the analysis device 10 may be a personal computer or the like.

An input/output interface 12 is an interface via which various types of information are input to the analysis device 10, or an interface via which various types of information are output from the analysis device 10.

The input/output interface 12 may be, for example, a network interface including a network adapter. With the network interface, the analysis device 10 can communicate with other devices, receive various types of information from other devices, and transmit various types of information to other devices.

The input/output interface 12 may also be, for example, an input interface including a keyboard and/or a mouse, or a touch panel. With the input interface, a user can input various types of information to the analysis device 10.

The input/output interface 12 may further be, for example, an output interface including a display including a liquid crystal panel, or a speaker. With the output interface, the analysis device 10 can output various types of information for a user or the like.

A memory 14 includes, for example, a hard disk drive (HDD), a solid state drive (SSD), a read only memory (ROM), or a random access memory (RAM). The memory 14 may be provided separately from a processor 20, described later, or at least a part of the memory 14 may be provided inside the processor 20. The memory 14 stores an analysis program, which serves as a hyperparameter tuning program, for operating each unit of the analysis device 10. The analysis program can be recorded in a non-transitory recording medium readable by a computer (the analysis device 10 in the present embodiment). In this case, the analysis device 10 can read the analysis program from the recording medium to execute the analysis program.

As illustrated in FIG. 1, the memory 14 also stores a first neural network (NN) 16, and a second NN 18 serving as a learner. It should be noted that, as described later, the entity of the first NN 16 includes a program that defines the structure of the first NN 16, various parameters related to the first NN 16, and a processing execution program for executing processing on input data. Accordingly, storing the first NN 16 in the memory 14 means that the programs and the various parameters, which have been described above, are stored in the memory 14. This also applies to the second NN 18.

The first NN 16 outputs, using analysis target data for the analysis device 10 as input, output data corresponding to the analysis target data. The analysis target data may be any data, and data in various fields can be used for the analysis target data. That is, the first NN 16 can be used for a wide range of fields.

A hyperparameter set is set in the first NN 16, and the hyperparameter set of the first NN 16 is a hyperparameter set to be subjected to tuning processing executed by the analysis device 10, which serves as a hyperparameter tuning device. Examples of the hyperparameter of the first NN 16 include, but are not limited to, the number of epochs, the number of hidden layers, the number of neurons in each hidden layer, the number of dropouts, or the number of batches.

The memory 14 stores a plurality of the first NNs 16 having respective different hyperparameter sets set therein.

Figure 2:
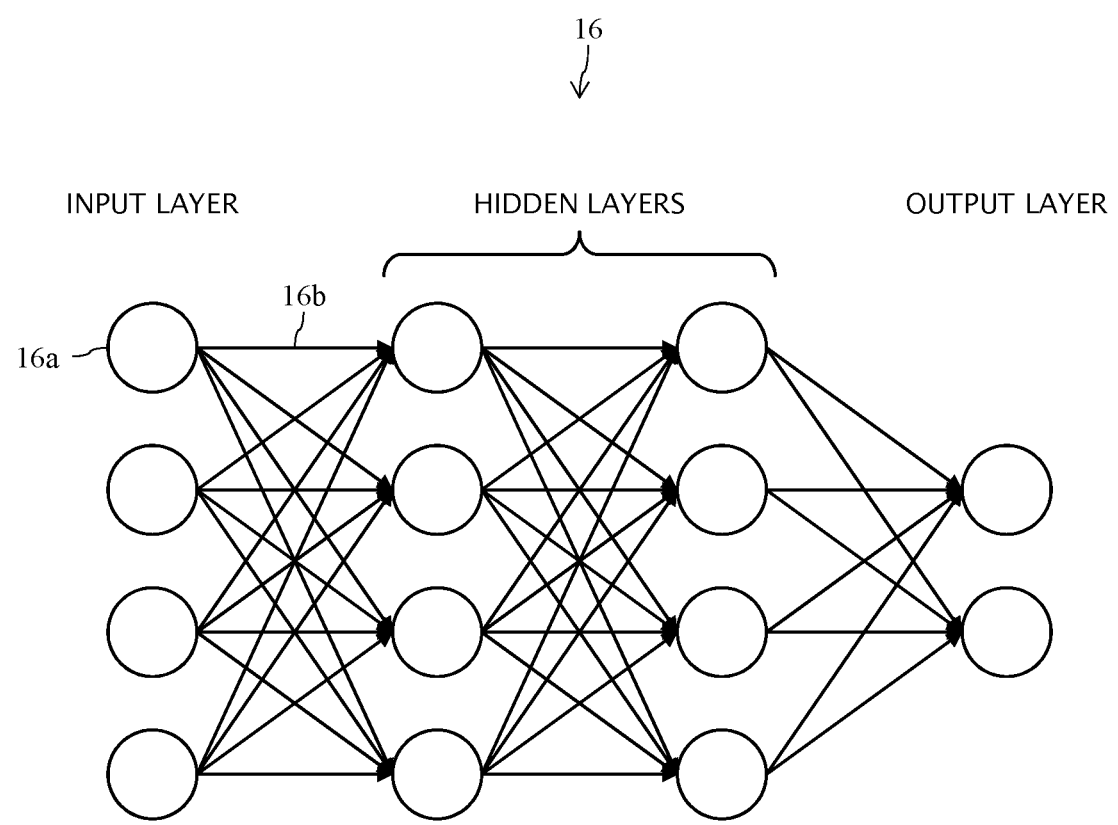
FIG. 2 is a conceptual diagram illustrating an example of a structure of a first NN.

FIG. 2 is a conceptual diagram illustrating an example of a structure of the first NN 16. As illustrated in FIG. 2, the first NN 16 includes a plurality of layers. Specifically, the first NN 16 includes an input layer positioned closest to the input side, an output layer positioned closest to the output side, and one or a plurality of hidden layers positioned between the input layer and the output layer. Each layer includes one or a plurality of neurons (nodes) 16a. In the example of FIG. 2, each neuron 16a is fully connected, and a neuron 16a in one layer is connected to all the neurons 16a in the next layer via a plurality of edges 16b.

The first NN 16 estimates output data corresponding to input data on the basis of the input data to output the output data. The first NN 16 is trained, and thus the accuracy of the output data with respect to the input data can be improved. For example, the first NN 16 can be trained by supervised learning. In this case, the first NN 16 is trained by using learning data including input data and teaching data corresponding to the input data. Specifically, the input data included in the learning data is input to the first NN 16. Then, a weight defined for each edge 16b and a bias defined for each neuron 16a are changed by a method such as an error backpropagation method (backpropagation), on the basis of an error between the output data of the first NN 16 responsive to the input data and the teaching data included in the learning data. Alternatively, the first NN 16 may be trained by another method, such as, for example, unsupervised learning, or reinforcement learning.

Figure 3:
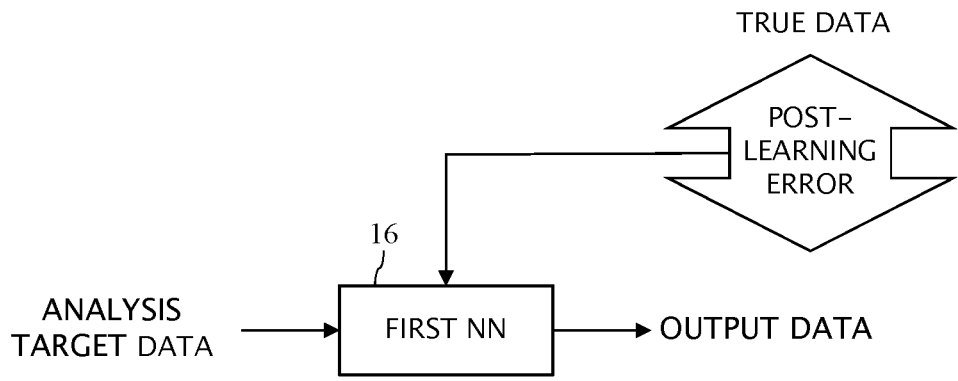
FIG. 3 is a conceptual diagram illustrating a post-learning error of the first NN.

FIG. 3 is a conceptual diagram illustrating a post-learning error, which serves as post-learning performance of the first NN 16. The first NN 16 illustrated in FIG. 3 is a trained one that has been sufficiently trained. As described above, an error between output data of the trained first NN 16 responsive to analysis target data (that is, input data input to the first NN 16), and true data (correct data) corresponding to the analysis target data is referred to as a post-learning error. The post-learning performance may also be post-learning analysis time, which is time from when analysis target data is input to the trained first NN 16 to when output data are output. The post-learning performance indicating the performance of the trained first NN 16 is not limited to the post-learning error and the post-learning analysis time.

Referring again to FIG. 1, the second NN 18 is an NN that is different from the first NN 16. The second NN 18 is a learner in which a hyperparameter set of the first NN 16 is used as input, and that is trained so as to output post-learning performance of the first NN 16 in which this hyperparameter set is set. Specifically, the second NN 18 is trained by using learning data including a hyperparameter set of the first NN 16 and post-learning performance of the first NN 16 (teaching data) in which this hyperparameter set is set. The post-learning performance serving as the teaching data may be a combination of a plurality of evaluation values, such as a combination of a post-learning error and post-learning analysis time. It should be noted that the structure of the second NN 18 may be similar to the structure of the first NN 16 (see FIG. 2). Needless to say, the hyperparameter of the second NN 18 may be different from the hyperparameter of the first NN 16.

It should be noted that, in the present embodiment, the second NN 18 is used as a learner that predicts the post-learning performance of the first NN 16, but the learner is not limited to the NN. For example, a multiple regression model that performs multiple regression analysis may be used as the learner. In the multiple regression analysis, an objective variable (here, post-learning performance of the first NN 16) is predicted by using a plurality of explanatory variables (here, a hyperparameter set). The equation for the multiple regression analysis is expressed as follows.

$$y = b_1 x_1 + b_2 x_2 + \ldots + b_k x_k + e$$

In the above equation, y represents an objective variable, each $x_n$ represents an explanatory variable (each $x_n$ corresponds to a corresponding one of hyperparameters of the first NN 16), each $b_n$ represents a coefficient of the explanatory variable $x_n$, and e represents a constant. The coefficient $b_n$ corresponding to each $x_n$ is changed by training using the learning data described above. In the multiple regression model, an adjustment parameter λ can be set, which is used for preventing each coefficient $b_n$ from being excessively large. The adjustment parameter λ is an example of a hyperparameter for the multiple regression model.

Although described in detail later, a second NN 18 that has been trained is used in tuning processing for hyperparameters of the first NN 16 executed by using a genetic algorithm. Specifically, the trained second NN 18 is used when the post-learning performance of the first NN 16 is calculated, which is used for calculating the fitness for the hyperparameter set, serving as an individual, of the first NN 16, in the processing for each generation of the genetic algorithm.

Details of a setting method of hyperparameters of the second NN 18 and a learning method for the second NN 18 will be described later, along with description of processing executed by the processor 20.

The processor 20 includes at least one of a general-purpose processing unit (for example, a central processing unit (CPU) or the like) or a dedicated processing unit (for example, an application specific integrated circuit (ASIC), a field programmable gate array (FPGA), a programmable logic device, or the like). The processor 20 need not be a single processing unit, but may be configured on the basis of cooperation of a plurality of processing units existing at physically separated positions. As illustrated in FIG. 1, the processor 20 is caused to function as a second-NN parameter determination unit 22, a learning processing unit 24, a genetic algorithm (GA) processing unit 26, and an output unit 28 by the analysis program stored in the memory 14.

The second-NN parameter determination unit 22, which serves as a learner parameter determination unit, determines hyperparameters (one parameter may be possible) of a learner that outputs the post-learning performance of the first NN 16. In the present embodiment, the second-NN parameter determination unit 22 determines a hyperparameter set of the second NN 18. Hereinafter, methods will be described, each of which is a representative method for determining the hyperparameters of the learner that outputs the post-learning performance of the first NN 16.

As a first method, the second-NN parameter determination unit 22 can determine the hyperparameters of the learner (the hyperparameter set of the second NN 18 in the present embodiment) that outputs the post-learning performance of the first NN 16, in accordance with an instruction from a user. Specifically, the second-NN parameter determination unit 22 determines the hyperparameter set of the second NN 18 on the basis of hyperparameter information indicating the hyperparameter set acquired from the user via the input/output interface 12.

For example, the network interface, which serves as the input/output interface 12, can receive the hyperparameter information indicating the hyperparameter set from a user terminal (not illustrated), after the user inputs the hyperparameter set to the user terminal. The user may also input the hyperparameter set of the second NN 18 to the analysis device 10 by operating the input interface, which serves as the input/output interface 12.

As a preferred variation of the first method, the user may select a hyperparameter set of the second NN 18 to be used, from a plurality of hyperparameter sets of the second NN 18. In this case, the selection is made by allowing an administrator or the like of the analysis device 10 to prepare the plurality of hyperparameter sets of the second NN 18 in advance, and by presenting the plurality of hyperparameter sets to the user.

This presentation of the plurality of hyperparameter sets to the user can be performed by transmitting information indicating the plurality of hyperparameter sets to the user terminal from the network interface, serving as the input/output interface 12, and by displaying the plurality of hyperparameter sets on a display of the user terminal. Further, the output interface, which serves as the input/output interface 12, may output the information indicating the plurality of hyperparameter sets for the user.

As a second method, the second-NN parameter determination unit 22 can determine the hyperparameters of the learner (the hyperparameter set of the second NN 18 in the present embodiment) that outputs the post-learning performance of the first NN 16, in accordance with an analysis target for the analysis device 10; that is, analysis target data input to the first NN 16.

The first NN 16 can receive various types of analysis target data as input, and thus an appropriate hyperparameter set may vary greatly depending on the analysis target data. In contrast, the input data input to the second NN 18 is the hyperparameter set of the first NN 16, and the output data of the second NN 18 are the post-learning performance of the first NN 16, regardless of whatever the analysis target data for the first NN 16 are. Thus, it can be said that the appropriate hyperparameter set of the second NN 18 is less likely to vary depending on the analysis target data for the first NN 16, as compared with the appropriate hyperparameter set of the first NN 16. However, an optimal hyperparameter set of the second NN 18 may also vary depending on the analysis target data for the first NN 16. In such a case, it is effective to determine the hyperparameter set of the second NN 18 in accordance with the analysis target data input to the first NN 16.

Specifically, for each type of analysis target data having been input to the first NN 16 in the past, association is made between a hyperparameter set of the second NN 18 used for tuning processing for the hyperparameter set of the first NN 16, and the output error of the trained second NN 18. Then, they are stored in the memory 14 as a database. After this process, the second-NN parameter determination unit 22 may acquire a type of analysis target data to be input to the first NN 16 whose hyperparameter set is to be tuned. Then, the second-NN parameter determination unit 22 may refer to the above database, and determine a hyperparameter set with a small output error from among hyperparameter sets of the second NN 18 corresponding to the type of analysis target data, as the hyperparameter set of the second NN 18. Alternatively, the second-NN parameter determination unit 22 may determine a plurality of hyperparameter sets each having a small output error from among the hyperparameter sets of the second NN 18 corresponding to the type of analysis target data, and present the determined plurality of hyperparameter sets to the user, thus allowing the user to select the one.

As a third method, the second-NN parameter determination unit 22 can determine the hyperparameters of the learner (the hyperparameter set of the second NN 18 in the present embodiment) that outputs the post-learning performance of the first NN 16, by using Bayesian optimization, which is conventionally used for optimization processing of hyperparameters of a learner.

The learning processing unit 24 executes learning processing in which the second NN 18 is trained, using a hyperparameter set of the first NN 16 as input, so as to output the post-learning performance of the first NN 16 in which the hyperparameter set is set. Hereinafter, a procedure of the learning processing executed by the learning processing unit 24 will be described.

First, the learning processing unit 24 trains a plurality of first NNs 16 in which respective different hyperparameter sets are set. The respective hyperparameter sets to be set in the plurality of first NNs 16 may be randomly set. Here, the number of plurality of first NNs 16 is set to a number with which superiority is not lost in processing amount or processing time of the tuning processing for the hyperparameters of the first NN 16, as compared to a conventional method. Specifically, the number of plurality of first NNs 16 here is set to a number less than G×N, in a case where, in a genetic algorithm, the GA processing unit 26, described later, executes processing for G generations and N hyperparameter sets are prepared as individuals in one generation. Alternatively, the number of plurality of first NNs 16 here is set to a number less than G×N×P, in a case where, in the genetic algorithm, the GA processing unit 26, described later, executes processing for G generations, N hyperparameter sets are prepared as individuals in one generation, and the fitness of each hyperparameter set is determined on the basis of P post-learning performances of P trained NNs in which the same hyperparameter is set.

The learning processing unit 24 trains each of the first NNs 16 by using learning data including analysis target data and data (teaching data) corresponding to the analysis target data. Specifically, the analysis target data is input to the first NN 16. Then, the weight of each edge 16*b* and the bias of each neuron 16*a* of the first NN 16 are changed, on the basis of an output error between output data of the first NN 16 responsive to the analysis target data, and the teaching data.

After the learning processing unit 24 has sufficiently trained the plurality of first NNs 16, the learning processing unit 24 evaluates each of the first NNs 16, and calculates post-learning performance of each of the first NNs 16. Specifically, in a case where a post-learning error is used for the post-learning performance, the calculation is made as illustrated in FIG. 3 by inputting analysis target data serving as evaluation data whose corresponding true data are known to the trained first NN 16, and by calculating the post-learning error that is an error between output data of the first NN 16 responsive to the analysis target data and the true data. The post-learning error may be an error rate between a plurality of pieces of output data and a plurality of pieces of true data, when a plurality of pieces of analysis target data are input to a single trained first NN 16. In a case where post-learning analysis time is used for the post-learning performance, the post-learning analysis time is set by measuring time from when analysis target data is input to the trained first NN 16 to when output data are output. The post-learning analysis time may be an average value of a plurality of pieces of analysis time, when analysis target data are input to a single first NN 16 a plurality of times. The post-learning performance may also be a numerical value representing a plurality of evaluation values, such as a combination of a post-learning error and post-learning analysis time.

With the processing described so far, it is possible to acquire a plurality of groups each including the hyperparameter set of the first NN 16 and post-learning performance corresponding to the hyperparameter set, as illustrated in FIG. 4. In the example of FIG. 4, each post-learning error is illustrated as the post-learning performance. The group of the hyperparameter set of the first NN 16 and the post-learning performance corresponding to the hyperparameter set is learning data for training the second NN 18. Of the learning data, the post-learning performance corresponding to each hyperparameter set is teaching data. The number of pieces of learning data is the number of plurality of sufficiently trained first NNs 16.

Next, the learning processing unit 24 sets the hyperparameters determined by the second-NN parameter determination unit 22, as the hyperparameters of the second NN 18.

Figure 5:
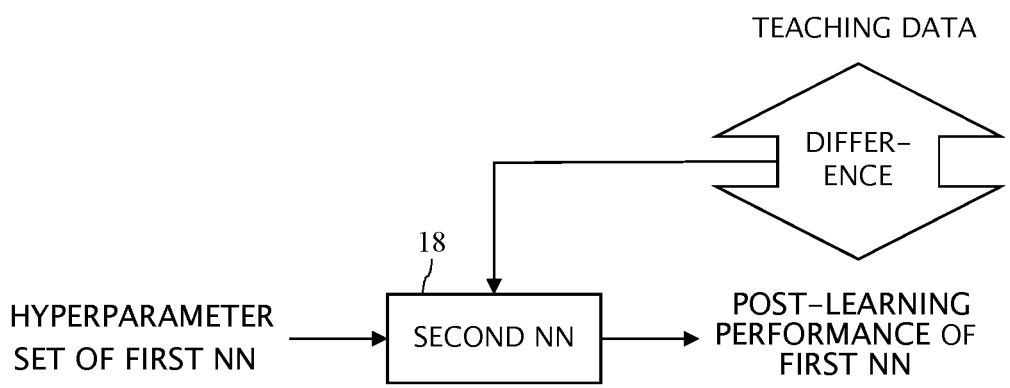
FIG. 5 is a conceptual diagram illustrating learning processing for the second NN.

Then, the learning processing unit 24 trains the second NN 18 by using, as learning data, the group of the hyperparameter set of the first NN 16 and the post-learning performance corresponding to the hyperparameter set. Specifically, as illustrated in FIG. 5, a hyperparameter set of the first NNs 16 is input to the second NN 18. Then, the weight of each edge and the bias of each neuron of the second NN 18 are changed, on the basis of a difference between output data (this indicates the post-learning performance of the first NN 16) of the second NN 18 for the hyperparameter set and teaching data.

When the second NN 18 is sufficiently trained by the learning processing as described above, inputting the hyperparameter set of the first NN 16 to the second NN 18 allows the second NN 18 to predict, with high accuracy, and output the post-learning performance acquired when the analysis target data are input to the first NN 16 in which this hyperparameter set is set. That is, with the trained second NN 18, it is possible to acquire the post-learning performance of the first NN 16 without training the first NN 16 on an each-time basis. Here, the post-learning performance output from the second NN 18 is a value indicating a post-learning error of the first NN 16, post-learning analysis time of the first NN 16, or a combination of these evaluation values.

The learning processing unit 24 may train a plurality of second NNs 18 in which the same hyperparameter set is set by using the learning data as illustrated in FIG. 4 to prepare a plurality of trained second NNs 18. It should be noted that each of the plurality of trained second NNs 18 in which the same hyperparameter set is set does not necessarily output the same output data with respect to the same input data. Further, the learning processing unit 24 may evaluate the output accuracy of a plurality of trained second NNs 18 by using evaluation data that is a part of the learning data, and select the second NN 18 with the highest output accuracy from among the plurality of trained second NNs 18, as a second NN 18 to be used for a genetic algorithm used by the GA processing unit 26, described later.

Figure 6:
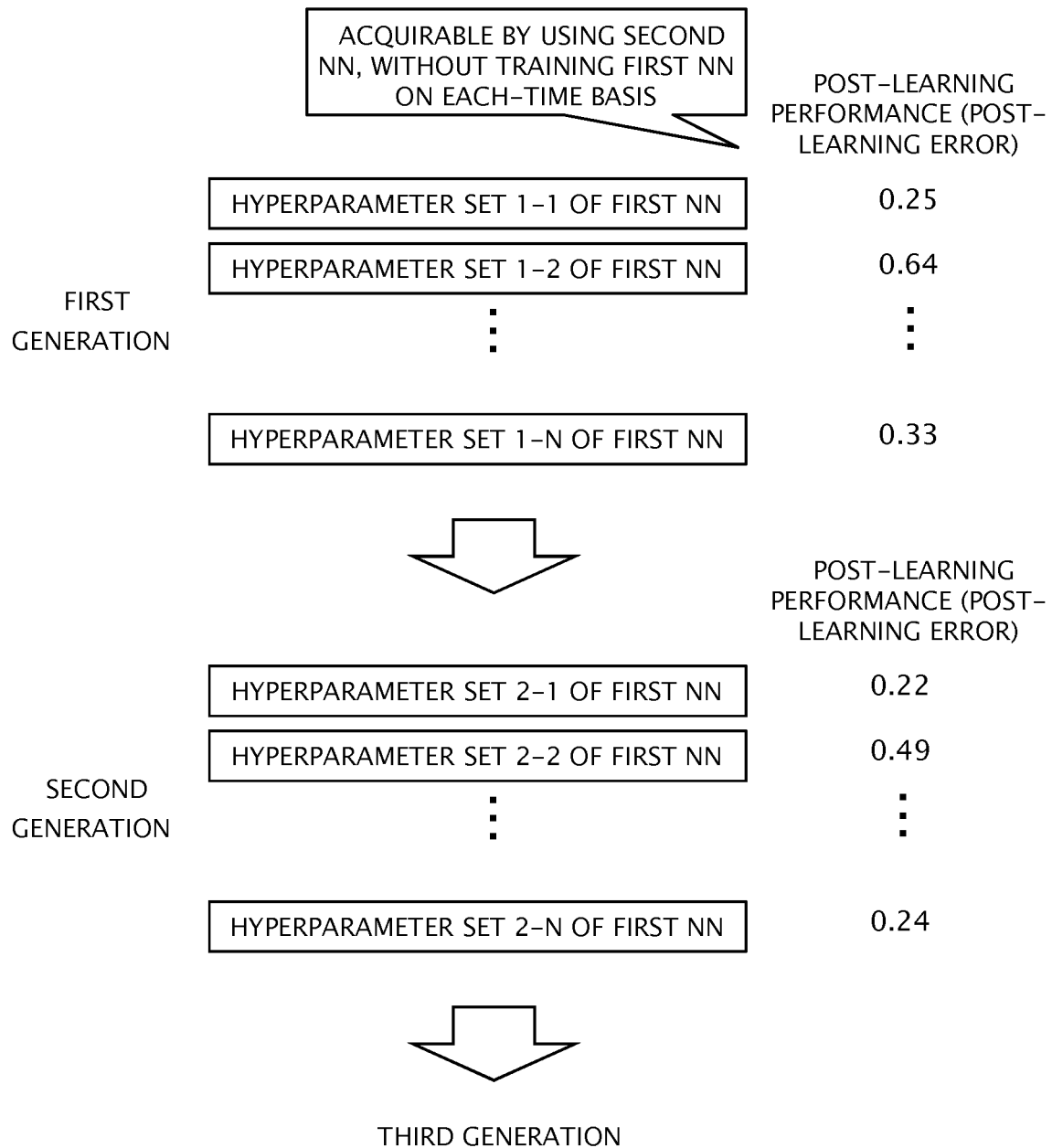
FIG. 6 is a conceptual diagram illustrating tuning processing for hyperparameter sets of the first NN using a genetic algorithm in the present embodiment.

The GA processing unit 26, which serves as a hyperparameter tuning unit, executes tuning processing for tuning the hyperparameter set of the first NN 16 by using a genetic algorithm. FIG. 6 is a conceptual diagram illustrating tuning processing for hyperparameter sets of the first NN 16 using the genetic algorithm, executed by the GA processing unit 26. The processing executed by the GA processing unit 26 will be specifically described with reference to FIG. 6.

Figure 8:
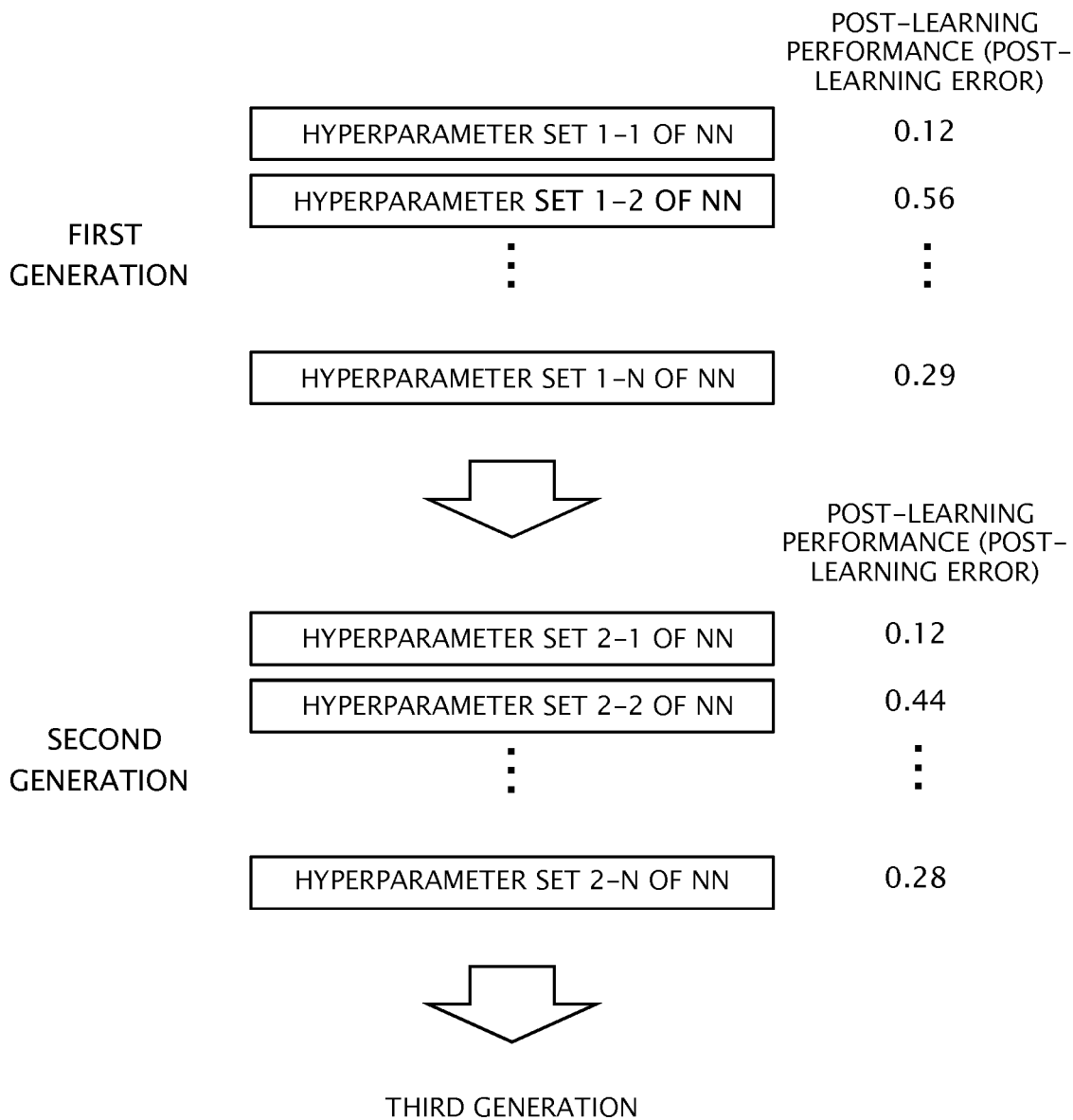
FIG. 8 is a conceptual diagram illustrating tuning processing for hyperparameter sets of an NN using a conventional genetic algorithm.

As illustrated in FIG. 6, an individual in the genetic algorithm used by the GA processing unit 26 is a hyperparameter set of the first NN 16. Each gene forming the individual is a respective hyperparameter forming the hyperparameter set. The fitness of each individual in the genetic algorithm used by the GA processing unit 26 is a value corresponding to the post-learning performance of the first NN 16 in which each corresponding hyperparameter set is set as a corresponding individual. Similarly to FIG. 8, also in FIG. 6, an n-th hyperparameter set of an m-th generation is described as a "hyperparameter set m-n."

First, the GA processing unit 26 prepares N individuals; that is, N first-generation hyperparameter sets, as an initial population. The GA processing unit 26 can randomly select a value of each hyperparameter included in the N first-generation hyperparameter sets.

Next, the GA processing unit 26 calculates the fitness of each of the N first-generation hyperparameter sets. Here, unlike the conventional processing, the GA processing unit 26 inputs each hyperparameter set to the trained second NN 18 to acquire the post-learning performance of the first NN 16 corresponding to each hyperparameter. It should be noted that, also in the example of FIG. 6, each post-learning error is illustrated as the post-learning performance. Then, the fitness of each hyperparameter is calculated on the basis of the acquired post-learning performance. There may be a case where a plurality of trained second NNs 18 are prepared. In this case, on the basis of a plurality of post-learning performances acquired by inputting a single hyperparameter to the plurality of second NNs 18, the fitness of this hyperparameter may be calculated. For example, on the basis of an average value of a plurality of post-learning performances acquired by inputting a single hyperparameter to a plurality of second NNs 18, the fitness of this hyperparameter may be calculated. As described above, in the present embodiment, the GA processing unit 26 does not need to train N NNs in which respective hyperparameter sets are set, when the fitness of each hyperparameter is calculated.

Next, the GA processing unit 26 generates N second-generation hyperparameter sets by using a known method, on the basis of the calculated fitness of each of the N first-generation hyperparameter sets. Then, the GA processing unit 26 calculates the fitness of each of the N second-generation hyperparameter sets. Also in the second generation, similarly to the first generation, the GA processing unit 26 inputs each hyperparameter set to the trained second NN 18 to acquire the post-learning performance of the first NN 16 corresponding to each hyperparameter. That is, also in the second generation, the GA processing unit 26 does not need to train N NNs in which respective hyperparameter sets are set, when the fitness of each hyperparameter is calculated.

The GA processing unit 26 further generates N third-generation hyperparameter sets, on the basis of the calculated fitness of each of the N second-generation hyperparameter sets. Thereafter, the GA processing unit 26 repeats processing similar to the above processing while advancing the generation. Repeating the processing described above while advancing the generation causes the hyperparameters of the first NNs 16 to be tuned. As a result, it is possible to acquire an individual with high fitness; that is, a hyperparameter set with high post-learning performance (ideally, an optimal hyperparameter set) of the first NN 16.

The GA processing unit 26 executes the genetic algorithm described above until a predetermined end condition is satisfied. Examples of the predetermined end condition include completion of processing up to a predetermined generation, completion of generating an individual with fitness exceeding a predetermined level, or attainment of a state in which average fitness of N individuals of a predetermined generation has reached a predetermined threshold value or higher.

When a hyperparameter set (ideally, an optimal hyperparameter) of the first NN 16 is acquired by the GA processing unit 26, the learning processing unit 24 sets the hyperparameter set in the first NN 16. Then, the first NN 16 is trained. As a result, the learning processing unit 24 can train the first NN 16 with high learning efficiency, and this can reduce an output error of the trained first NN 16.

Referring again to FIG. 1, the output unit 28 inputs analysis target data, for example, input from a user to the trained first NN 16, and provides the user with output data, output from the first NN 16, that corresponds to the target data. As described above, the hyperparameters of the first NN 16 used in the present embodiment are tuned, and thus the output unit 28 can provide the user with highly accurate output data corresponding to the analysis target data.

The outline of the analysis device 10 according to the present embodiment is as described above. In accordance with the analysis device 10 according to the present embodiment, the second NN 18 is trained so as to output the post-learning performance of the first NN 16 on the basis of the hyperparameters of the first NN 16. In addition, in the tuning processing for the hyperparameters of the first NN 16 using the genetic algorithm used by the GA processing unit 26, the trained second NN 18 is used to acquire the post-learning performance for the hyperparameter of each first NN 16. In the processing for each generation of the genetic algorithm, it is therefore not necessary to train the first NN 16 on an each-time basis, in the calculation of the fitness of each individual; that is, in the processing of acquiring the post-learning performance of each hyperparameter of the first NN 16. As a result, reduction is achieved in the processing amount or the processing time required when the hyperparameter set of the first NN 16 is tuned by using the genetic algorithm.

Figure 7:
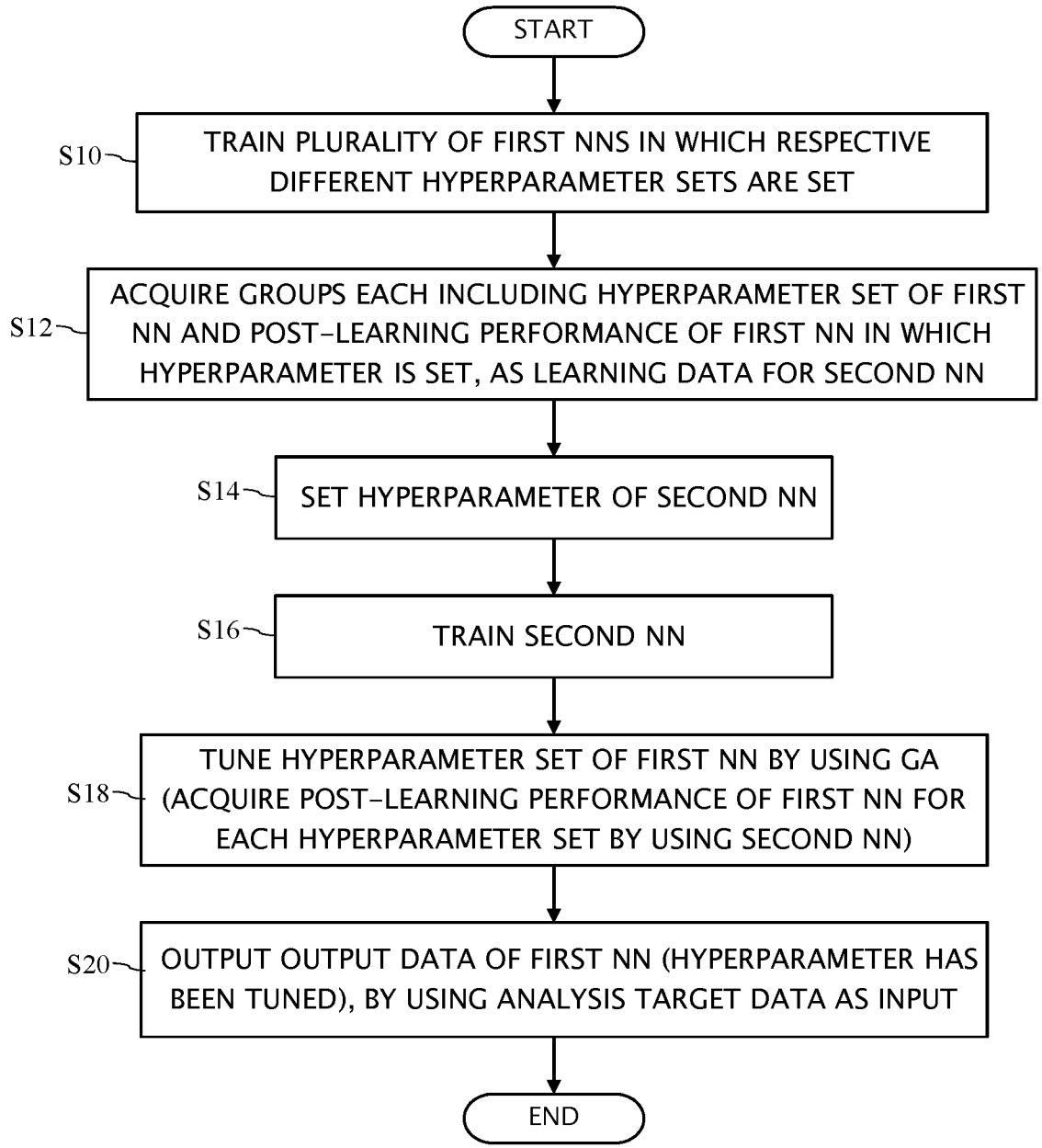
FIG. 7 is a flowchart illustrating a flow of processing executed by the analysis device in the present embodiment.

Hereinafter, a flow of processing executed by the analysis device 10 according to the present embodiment will be described with reference to the flowchart illustrated in FIG. 7.

In step S10, which is a step of training the first NN 16, the learning processing unit 24 sets respective different hyperparameter sets in a plurality of first NNs 16, and then trains the plurality of first NNs 16.

In step S12, which is a step of acquiring learning data, the learning processing unit 24 evaluates the plurality of trained first NNs 16, and calculates the post-learning performance of each of the first NNs 16. As a result, a plurality of groups, each of which is learning data for the second NN 18 and includes the hyperparameter set of the first NN 16 and the post-learning performance corresponding to the hyperparameter set, is acquired.

In step S14, which is a step of setting the hyperparameter set of the second NN 18, the second-NN parameter determination unit 22 determines the hyperparameter set of the second NN 18 by any of the methods described above, and sets the hyperparameter set in the second NN 18.

In step S16, which is a step of training the second NN 18, the learning processing unit 24 trains the second NN 18 by using the learning data acquired in step S12. The trained second NN 18 uses the hyperparameters of the first NN 16 as input, and this allows the second NN 18 to predict, with high accuracy, and output the post-learning performance of the first NN 16 in which the hyperparameters are set.

In step S18, which is a step of tuning the hyperparameter set of the first NN 16, the GA processing unit 26 tunes the hyperparameters of the first NN 16 by using a genetic algorithm, where the hyperparameter set of the first NN 16 is used as an individual and a value corresponding to the post-learning performance of the first NN 16 in which the hyperparameter set is set is used as the fitness. The fitness in each generation of the genetic algorithm (that is, the post-learning performance for each hyperparameter set) is acquired by using the second NN 18, which has been trained in step S16. With the processing using the genetic algorithm, a tuned (ideally, optimized) hyperparameter of the first NN 16 is acquired.

In step S20, which is a step of providing output data, first, the learning processing unit 24 sets the hyperparameter set acquired in step S18 in the first NN 16, and trains the first NN 16. Then, the output unit 28 provides a user with output data acquired by inputting analysis target data to the trained first NN 16.

Although the embodiment according to the present invention has been described above, the present invention is not limited to the above embodiment, and various modifications can be made without departing from the gist of the present invention.

For example, in the present embodiment, the tuning processing for the hyperparameter set of the first NN 16 is executed by using the genetic algorithm used by the GA processing unit 26. However, the tuning processing is not limited to the method using the genetic algorithm.

In particular, a heuristic search technique can be used for the tuning processing. The heuristic search technique is a method in which an optimal solution is not necessarily derived, but an answer approximate to the optimal solution can be acquired to some extent. In particular, the heuristic search method includes a technique of acquiring an answer through trial and error. In the present embodiment, the meaning of the trial and error is a process of setting the hyperparameter of the first NN 16 to various values on a trial basis, and tuning the hyperparameter of the first NN 16 on the basis of the result (the post-learning performance of each first NN 16).

For the heuristic search technique, various methods are conceivable.

For example, the tuning processing may use a method based on reinforcement learning. The reinforcement learning is the following technique. That is, a reward given when an action is taken from a certain state is set, various actions are taken through trial and error, and an optimal action or state is searched for on the basis of the rewards for the actions. An example in the present embodiment is as follows. That is, a certain hyperparameter set of the first NN 16 corresponds to a state, and processing of correcting the hyperparameter set (that is, processing of changing the hyperparameter set into another hyperparameter set) corresponds to an action. The reward in this case can be determined on the basis of output of a trained learner (for example, the second NN 18) in which the corrected hyperparameter set is used as input; that is, post-learning performance of the first NN 16 acquired when the corrected hyperparameter set is set in the first NN 16. Such reinforcement learning includes Q-learning and a deep Q-network (DQN).

The tuning processing may use a method using a grid search. The grid search is a technique of searching for an optimal solution for a plurality of combinations of parameters. Specifically, in the grid search, possible combinations (for example, all possible combinations) are comprehensively searched for, and then a combination indicating the best result is determined from among the possible combinations. In the present embodiment, a plurality of respective hyperparameter sets (each one is a combination of hyperparameters) of the first NNs 16 is comprehensively set. Then, a hyperparameter set indicating the best result is determined from among the plurality of set hyperparameter sets on the basis of the post-learning performance, which has been acquired by using a trained learner, of each of the first NNs 16 in which the respective hyperparameter sets are set.

The tuning processing may use a method using a random search. The random search is, similarly to the grid search, a technique of searching for an optimal solution for a plurality of combinations of parameters. However, in the random search, a plurality of randomly determined combinations of parameters are searched for, and a combination indicating the best result is determined from among the combinations. In the present embodiment, a plurality of respective hyperparameter sets (each one is a combination of hyperparameters) of the first NNs 16 is randomly set. Then, a hyperparameter set indicating the best result is determined from among the plurality of set hyperparameter sets on the basis of the post-learning performance, which has been acquired by using a trained learner, of each of the first NNs 16 in which the respective hyperparameter sets are set.

The tuning processing may use a method using Bayesian optimization. The Bayesian optimization is a technique of searching for a combination highly probably indicating the best evaluation value by optimizing a surrogate function, which is referred to as an acquisition function, on the basis of a plurality of combinations of parameters and their evaluation values. In the present embodiment, on the basis of respective hyperparameter sets (each one is a combination of hyperparameters) of a plurality of first NNs 16 and the post-learning performance, which has been acquired by using a trained learner, of each of the first NNs 16 in which the respective hyperparameter sets are set, a hyperparameter set indicating the best result is determined from among the plurality of set hyperparameter sets. The Bayesian optimization is originally a technique of searching for an optimal solution from a small number of trials and errors, and is currently used for searching for a hyperparameter set of an NN without using a learner. However, in a case of an NN in which even the same hyperparameter set is used but large variations may occur in the post-learning performance, there is a possibility that an appropriate optimal solution cannot be acquired, because if a numerical value of actual post-learning performance is used without any measures, these meaningless variations also become an excessively trained state (overtraining). Using the learner in the present embodiment enables use of a numerical value, in which the variations are appropriately reduced, of the post-learning performance. Thus, it is possible to avoid overtraining, therefore allowing a search for an optimal solution with high accuracy.

REFERENCE SIGNS LIST

10 analysis device
12 input/output interface
14 memory
16 first NN
16*a* neuron
16*b* edge
18 second NN
20 processor
22 second-NN parameter determination unit
24 learning processing unit
26 GA processing unit
28 output unit

The invention claimed is:

1. A hyperparameter tuning device including a processor, the hyperparameter tuning device comprising:
    a learning processing unit operated by the processor and configured to train a learner, using a hyperparameter set of a first neural network as input of the learner, to cause the learner to output post-learning performance, the post-learning performance being performance of the first neural network in which the hyperparameter set is set responsive to the first neural network having been trained; and
    a hyperparameter tuning unit operated by the processor and configured to tune the hyperparameter set of the first neural network by repeating a process, without training a plurality of the first neural networks in each of which a corresponding one of a plurality of hyperparameter sets is set, of generating a plurality of new hyperparameter sets on the basis of the plurality of hyperparameter sets, and inputting each of the plurality of new hyperparameter sets that have been generated into the learner that has been trained, to acquire the post-leaning performance of the plurality of the first neural networks in each of which a corresponding one of the plurality of new hyperparameter sets is set, wherein the plurality of new hyperparameter sets are generated based on the post-learning performance of a plurality of the first neural networks in each of which a corresponding one of a plurality of hyperparameter sets of the first neural network is set, the post-learning performance of the plurality of the first neural networks being acquired by inputting each of the plurality of hyperparameter sets to the learner that has been trained.

2. The hyperparameter tuning device according to claim 1, wherein the hyperparameter tuning unit is configured to tune the hyperparameter set of the first neural network by using a heuristic search technique, the heuristic search technique using the post-learning performance of a plurality of the first neural networks in each of which a corresponding one of a plurality of hyperparameter sets of the first neural network is set, the post-learning performance of the plurality of the first neural networks being acquired by inputting each of the plurality of hyperparameter sets to the learner that has been trained.

3. The hyperparameter tuning device according to claim 2, wherein the hyperparameter tuning unit is a genetic algorithm processing unit that is configured to tune the hyperparameter set of the first neural network by using a genetic algorithm, the genetic algorithm using, as an individual, the hyperparameter set of the first neural network and using, as fitness, a value corresponding to the post-learning performance of the first neural network in which the hyperparameter set is set and which has been trained, the post-learning performance of the first neural network being acquired by inputting the hyperparameter set to the learner that has been trained, wherein the genetic algorithm repeats a process of generating a plurality of next-generation individuals based on the fitness of each of a plurality of the individuals.

4. The hyperparameter tuning device according to claim 1, further comprising a learner parameter determination unit operated by the processor and configured to determine a hyperparameter of the learner, in accordance with analysis target data which is input to the first neural network.

5. The hyperparameter tuning device according claim 1, wherein the learner includes a second neural network that is different from the first neural network.

6. A non-transitory computer-readable recording medium in which a hyperparameter tuning program is recorded, the hyperparameter tuning program causing a computer to function as:

a learning processing unit operated by a processor of the computer and configured to train a learner, using a hyperparameter set of a first neural network as input of the learner, to cause the learner to output post-learning performance, the post-learning performance being performance of the first neural network in which the hyperparameter set is set responsive to the first neural network having been trained; and a hyperparameter tuning unit operated by the processor and configured to tune the hyperparameter set of the first neural network by repeating a process, without training a plurality of the first neural networks in each of which a corresponding one of a plurality of hyperparameter sets is set, of generating a plurality of new hyperparameter sets on the basis of the plurality of hyperparameter sets, and inputting each of the plurality of new hyperparameter sets that have been generated into the learner that has been trained, to acquire the post-leaning performance of the plurality of the first neural networks in each of which a corresponding one of the plurality of new hyperparameter sets is set, wherein the plurality of new hyperparameter sets are generated based on the post-learning performance of a plurality of the first neural networks in each of which a corresponding one of a plurality of hyperparameter sets of the first neural network is set, the post-learning performance of the plurality of the first neural networks being acquired by inputting each of the plurality of hyperparameter sets to the learner that has been trained.

* * * * *